United States Patent [19]

Tsai

[11] Patent Number: 5,423,472
[45] Date of Patent: Jun. 13, 1995

[54] DELIVERY DEVICE FOR A SOLDER WIRE

[76] Inventor: Jung-Fa Tsai, No. 277, Wuchuan Rd., Taichung City, Taiwan, Prov. of China

[21] Appl. No.: 248,402

[22] Filed: May 24, 1994

[51] Int. Cl.⁶ ................................................ B23K 3/06
[52] U.S. Cl. ...................................... 228/41; 228/52; 226/128
[58] Field of Search .................. 228/41, 53, 52; 226/127, 128, 129, 133, 167

[56] References Cited

U.S. PATENT DOCUMENTS

| | | | |
|---|---|---|---|
| 1,951,545 | 3/1934 | Carson, Jr. | 226/167 |
| 2,317,936 | 4/1943 | Nicholson et al. | 228/41 |
| 4,614,295 | 9/1986 | Köchli | 228/41 |
| 5,019,688 | 5/1991 | Cheng | 228/53 |

FOREIGN PATENT DOCUMENTS 1249989 11/1960 France ................................ 228/52

*Primary Examiner*—Mark Rosenbaum
*Assistant Examiner*—Jeffrey T. Knapp
*Attorney, Agent, or Firm*—Peterson, Wicks, Nemer & Kamrath

[57] ABSTRACT

A delivery device for a solder wire includes a main body, an operating element and an attaching device. The main body has a front end, a mediate portion and a rear end, the front end having a defined exit and the rear end having a defined entrance and the mediate portion having a defined recess. The recess communicates with both the entrance and the exit and the solder wire extends through the main body via the entrance and the exit. The operating element has a first end pivotally engaged to the main body and a pushing bar has a first end pivotally engaged to the operating element and a second end contacting the solder wire in the main body, A resilient element has a first end connecting to the operating element and a second end connecting to the pushing bar between the first and second ends thereof. The attaching device is disposed to an under side of the main body and has a gripping portion to grip the soldering iron. A user pushes the operating element and the pushing bar is activated to push the solder wire forwardly.

7 Claims, 3 Drawing Sheets

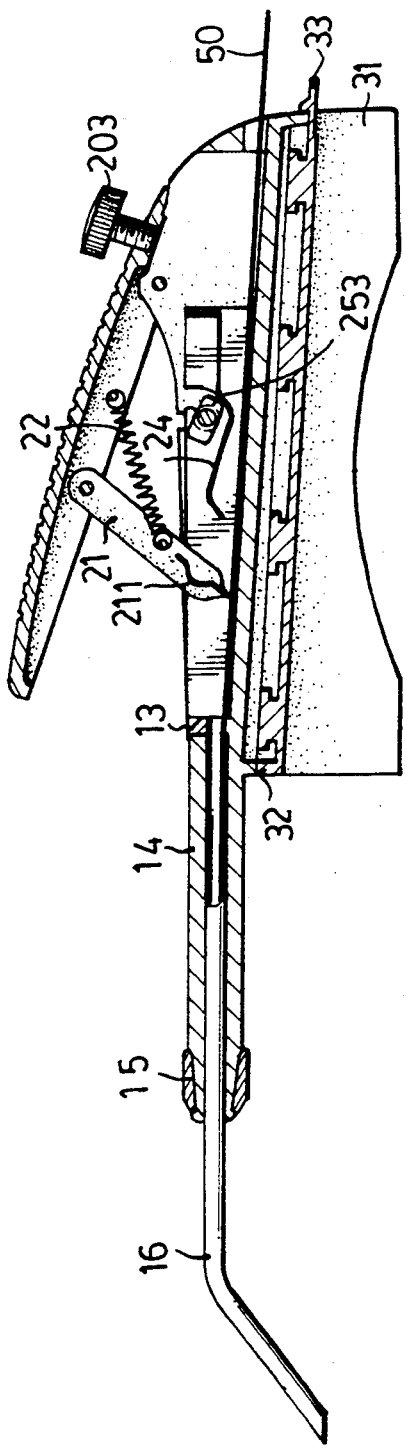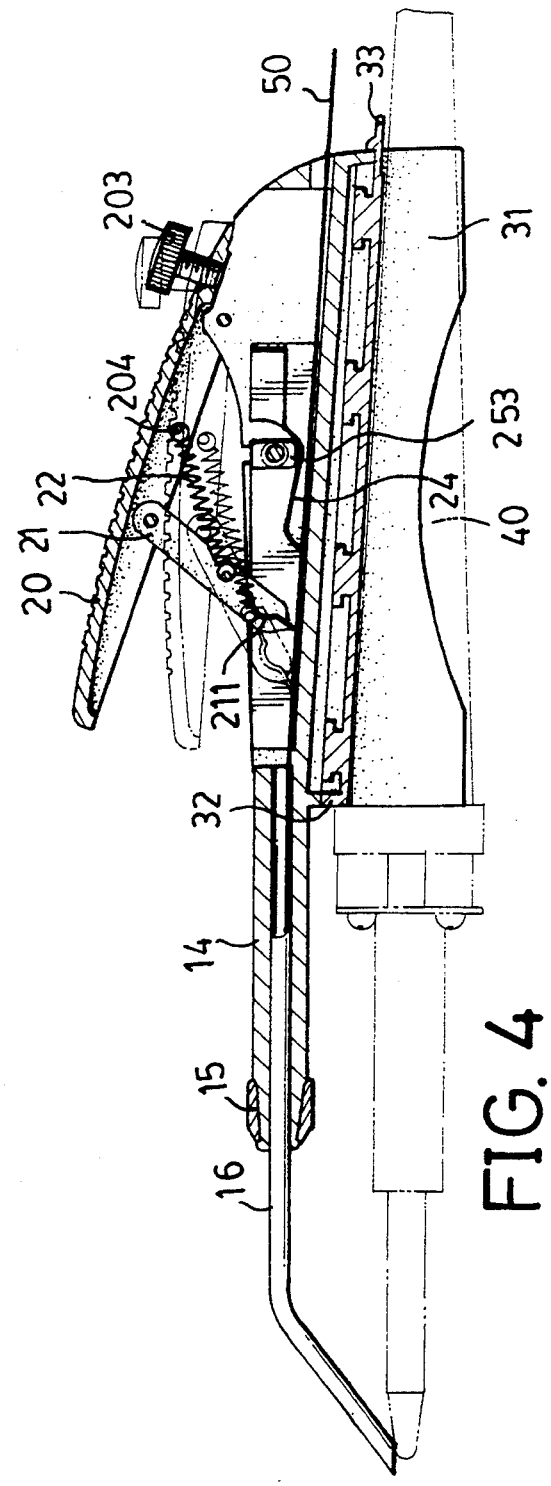

DELIVERY DEVICE FOR A SOLDER WIRE

BACKGROUND OF THE INVENTION

The present invention relates to a delivery device for a soldering wire and more particularly, to a solder wire delivery device which has an attaching means incorporated therewith and a soldering iron is attached to the attaching means. The soldering wire passing through the delivery device can be moved forwardly by actuating an operating element disposed in the delivery device.

As well known, a conventional soldering iron having a head portion and a handle portion is designed to be used with a soldering wire, the head portion produces high temperature to melt the soldering wire for soldering. In use, a user holds the handle portion and puts the solder wire onto abutting surfaces of two objects and moves the head portion to contact the soldering wire and to melt it to combine the two objects. However, there is a drawback of inconvenience because the user must use one hand to hold the soldering iron and use the other hand to hold the soldering wire, and that means the user cannot adjust the objects to be soldered when needed.

The present invention intends to provide a soldering wire delivery device which is attached to a soldering iron, solder wire is passed through the delivery device, which can be moved forwardly by actuating an operating element disposed thereto and this mitigates and/or obviates the above-mentioned problems.

SUMMARY OF THE INVENTION

The present invention provides a delivery device for solder wire, which includes a main body, an operating element and an attaching device. The main body has a front end, a mediate portion and a rear end, the front end having an exit defined therein and the rear end having an entrance defined therein and the mediate portion having a recess defined therein. The recess communicates with both the entrance and the exit and the soldering wire extends through the main body via the entrance and the exit. The operating element has a first end pivotally engaged to the main body and a pushing bar has a first end pivotally engaged to the operating element and a second end contacting to the solder wire in the main body. A resilient element has a first end connecting to the operating element and a second end connecting to the pushing rod between the first and second ends thereof. The attaching means is disposed to an under side of the main body and has a gripping portion to grip the soldering iron. A user pushes the operating element and the pushing bar is activated to push the solder wire forwardly.

It is an object of the present invention to provide a delivery device for solder wire, which is used with a soldering iron only by one hand of a user.

Other objects, advantages, and novel features of the invention will become more apparent from the following detailed description when taken in conjunction with the accompanying drawings.

BRIEF DESCRIPTION OF THE DRAWINGS

FIG. 3 is a side elevational view, partly in section, of the delivery device which shows a pipe with a bent end extending from main body of the device;

FIG. 4 is a side elevational view, partly in section, of the delivery device which connects to a conventional soldering iron and an action of an operating element is shown by phantom lines.

DETAILED DESCRIPTION OF THE PREFERRED EMBODIMENT

Figure 1:
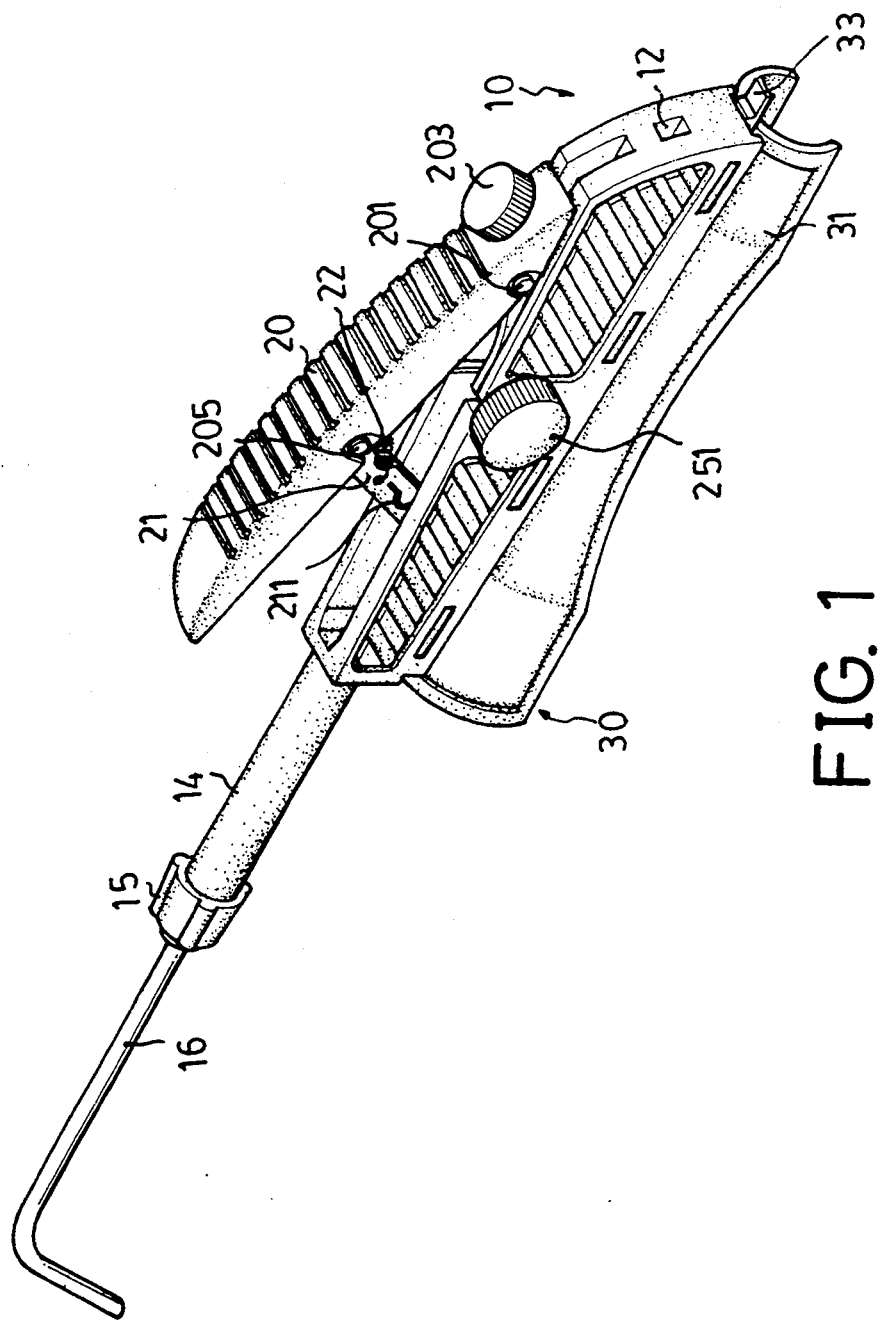
FIG. 1 is a perspective view of a delivery device for solder wire in accordance with the present invention.
Figure 2:
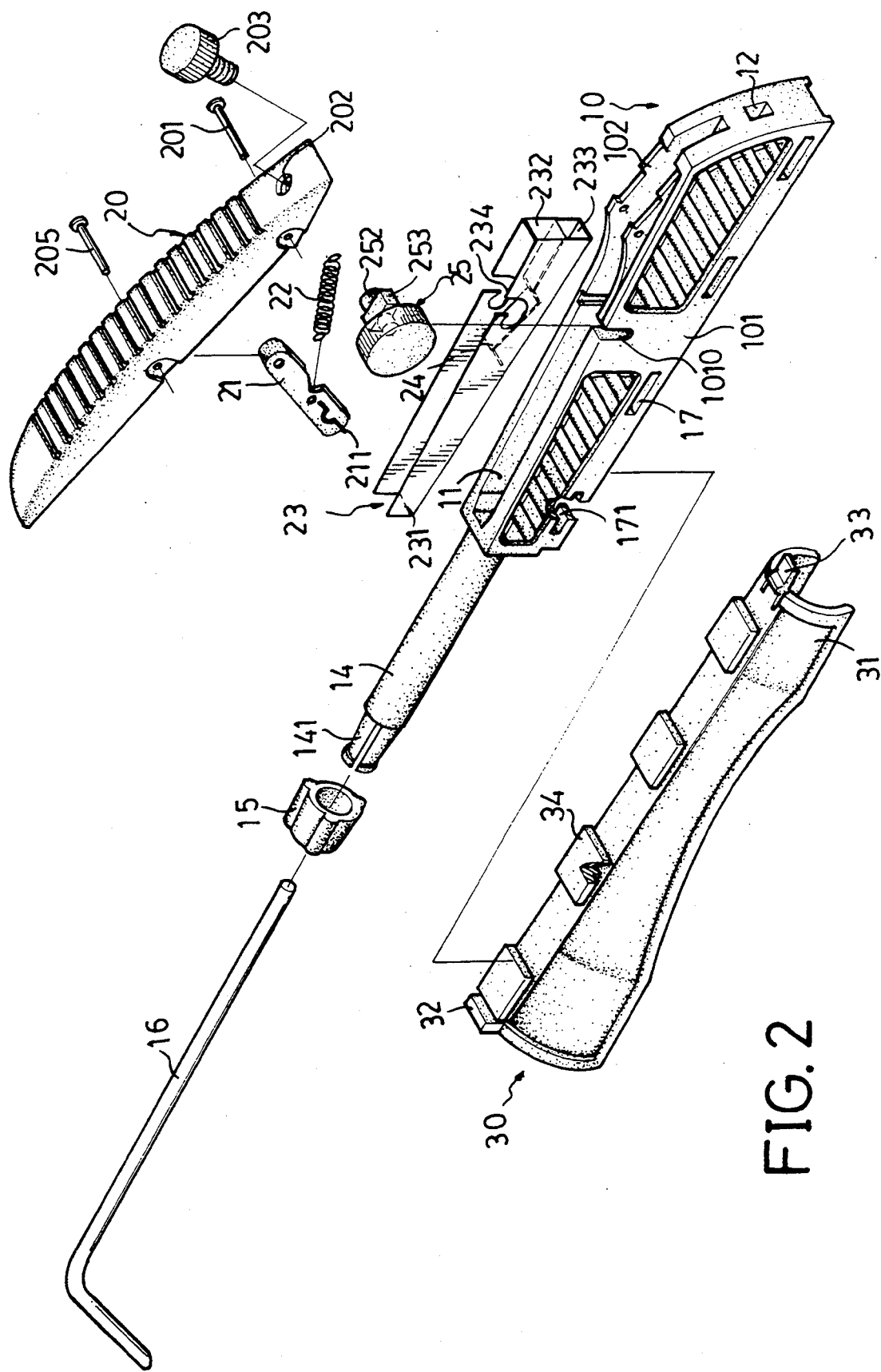
FIG. 2 is an exploded view of the delivery device in accordance with the present invention.

Referring to the drawings and initially to FIGS. 1 and 2, a delivery device in accordance with the present invention generally includes a main body 10, an operating element 20, a pushing bar 21 and an attaching means 30. The main body 10 has a front end and a rear end, and has a recess 11 defined by two opposite side walls 101, 102 and the front and rear ends thereof. A slot 1010 is defined in each of the side walls 101, 102. An entrance 12 is defined in the rear end of the main body 10 and an exit 13 (see FIG. 3) is defined in the front end of the main body 10. An extending tube 14 has a first end disposed at the front end of the main body 10 and which communicates with the exit 13, and a second end, the formed as a tapered collet 141 with a plurality of longitudinal slits defined therein. A pipe 16 with a bent distal end can be inserted in the extending tube 14 and is fixed by engaging a ring element 15 to the tapered collet 141 of the extending tube 14. The sidewalls 101, 102 of the main body 10 have a plurality of slots 17 defined in a lower end thereof, a plurality of flanges 171 projecting inwardly from an inner side of the sidewalls 101, 102 and each flange 171 projects below each hole 17.

The operating element 20 is pivotally engaged to the main body 10 at a first end thereof by a pin 201 being insert through holes defined both in the first end of the operating element 20 and the main body 10, a vertical threaded hole 202 is defined in the first end thereof for engagement with a bolt 203. A pushing bar 21 has a first end pivotally engaged to the operating element 20 by a pin 205 being inserted through holes defined in both the operating element 20 and the pushing bar 21 and a second end being inserted into the recess 11. A metal spike 211 is inserted from a side of the pushing bar 21 and extends a sharp end from the second end of the pushing bar 21. A resilient element 22 is connected between a middle portion of the pushing bar 21 and a boss 204 (see FIG. 4) extending inwardly from an inner side of the operating element 20 such that the pushing bar 21 has a tendency to be maintained in a position where the operating element 20 is not depressed.

An auxiliary element 23 comprises a bottom and two side plates 231 which are further connected at one end thereof by a connecting plate 232 and an opening 233 is defined by the connecting plate 232, the two side plates 231 and the bottom. A pressing element 24 is attached to the connecting plate 232 by one end thereof. An inverted-L shaped recess 234 is defined in both side plates 231 of the auxiliary element 23. Both the auxiliary element 23 and the pressing element 24 can be disposed in the recess 11 of the main body 10. An adjusting element 25 has a head part 251 and a shaft 252 centrally extending from a side thereof and a rectangular enlarged portion 253 extends laterally from the shaft 252. The rod 252 of the adjusting element 25 is received into the slots 1010 and the recesses 234, and the rectangular enlarged portion 253 is able to press the pressing element 24 through rotation of the adjusting element 25.

The attaching means 30 having first and second ends has a gripping portion 31 which includes two curved gripping plates by which a soldering iron 40 (best shown in FIG. 4) can be securely held within the gripping portion 31. The first end of the attaching means 30 has a stop 32 projecting vertically upward therefrom and the second end thereof has a hook element 33 disposed thereon. A plurality of projections 34 extends horizontally from an upper surface of the attaching means 30 such that the projections 34 can be slid along upper surfaces of the flanges 171 from the first end of the main body 10 and are stopped when the hook element 33 engages with an edge of the second end of the main body 10, simultaneously, the stop 32 contacts against the front end of the main body 10 such that the attaching means 30 is fixedly engaged to the main body 10.

Referring now to FIGS. 3 and 4, the solder wire 50 is inserted in the entrance 12 of the main body 10 through the recess 11 and extends through the extending tube 14 via the exit 13 and comes out from the bent end of the pipe 16 which is slightly beyond a tip of the soldering iron 40. The solder wire 50 is moved by pressing the operating element 20 to let the sharp end of the metal spike 211 push the solder wire 50 forwards. In addition, the solder wire 50 is pressed by the enlarged portion 253 by rotating the adjusting element 25, which means the solder wire 50 will not move backwards during operation. The second end of the pushing bar 21 will slide back to an original position when releasing the operating element 20. A pivotal movement of the operating element 20 is limited by adjusting the depth of threading the bolt 203 in the threaded hole 202, the deeper the bolt 203 is threaded the smaller the distance defined between the operating element 20 and the bolt 203, which means that the operating element 20 will contact the bolt 203 when the operating element 20 returns.

Although the invention has been explained in relation to its preferred embodiment, it is to be understood that many other possible modifications and variations can be made without departing from the spirit and scope of the invention as hereinafter claimed.

I claim:

1. A delivery device for solder wire, said delivery device delivering said solder wire to a soldering iron and comprising:

a main body having a front end, a rear end and a mediate portion defined by two opposite side walls, said front end having an exit defined therein and said rear end having an entrance defined therein and said mediate portion having a recess defined therein, said recess communicating with said entrance and said exit, a pressing element having a first end and a second end received in said main body, said first end of said pressing element fixedly engaged to said rear end of said main body, a slot defined in each said two opposite side walls of said mediate portion for an adjusting element disposed therein and said adjusting element having an enlarged portion formed thereon which can press said pressing element down by rotating said adjusting element;

an operating element having a first end pivotally engaged to said main body, a pushing bar having a first end pivotally engaged to said operating element and a second end extending into said recess of said main body, a resilient element having a first end connected to said operating element and a second end connected to said pushing bar between said first and second ends thereof; and an attaching means having a portion to said soldering iron.

2. The delivery device as claimed in claim 1 wherein said first end of said operating element has a vertical threaded hole defined therein for engaging with a bolt therein which limits pivotal movement of said operating element.

3. The delivery device as claimed in claim 1 wherein said main body has an extending tube extending longitudinally from said front end thereof and communicating with said exit.

4. The delivery device as claimed in claim 3 wherein said extending tube has a pipe disposed therein, said pipe has a bent end formed on a distal end thereof.

5. The delivery device as claimed in claim 3 wherein said extending tube has a tapered collet extending from a distal end thereof and said collet engages with a ring element to securely fix said pipe thereto.

6. A delivery device for solder wire, said delivery device delivering said solder wire to a soldering iron and comprising:

a main body having a front end, a rear end and a mediate portion defined by two opposite side walls, said front end having an exit defined therein and said rear end having an entrance defined therein and said mediate portion having a recess defined therein, said recess communicating with said entrance and said exit;

an operating element having a first end pivotally engaged to said main body, a pushing bar having a first end pivotally engaged to said operating element and a second end extending into said recess of said main body, a resilient element having a first end connected to said operating element and a second end connected to said pushing bar between said first and second ends thereof; and an attaching means having a gripping portion to grip said soldering iron and having a plurality of projections projecting horizontally from an upper surface thereof and, wherein each said side wall has at least one flange projecting inwardly from an inner side thereof for said projections to engage thereon.

7. The delivery device as claimed in claim 6 wherein said attaching means has first and second ends, at least one stop projecting vertically from said first end thereof and a hook element disposed on said second end thereof for secure engagement to said rear end of said main body.

* * * * *